United States Patent
Kim et al.

(10) Patent No.: US 11,494,025 B2
(45) Date of Patent: Nov. 8, 2022

(54) RADIO FREQUENCY DEVICE AND DISPLAY DEVICE INCLUDING THE SAME

(71) Applicant: SAMSUNG DISPLAY CO., LTD., Yongin-si (KR)

(72) Inventors: Kiseo Kim, Yongin-si (KR); Jae-Kyoung Kim, Hwaseong-si (KR); Wonsang Park, Yongin-si (KR); Bonghyun You, Seoul (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 17/095,846

(22) Filed: Nov. 12, 2020

(65) Prior Publication Data

US 2021/0247871 A1    Aug. 12, 2021

(30) Foreign Application Priority Data

Feb. 7, 2020    (KR) .................. 10-2020-0014965

(51) Int. Cl.
  *G06F 3/041*    (2006.01)
  *H01Q 1/24*    (2006.01)
  *H01Q 1/22*    (2006.01)
  *H01Q 1/52*    (2006.01)
  *G09G 3/00*    (2006.01)

(52) U.S. Cl.
  CPC ......... *G06F 3/0416* (2013.01); *H01Q 1/2266* (2013.01); *H01Q 1/245* (2013.01); *H01Q 1/526* (2013.01); *G06F 2203/04107* (2013.01); *G09G 3/00* (2013.01)

(58) Field of Classification Search
  CPC .. G06F 3/0416; G06F 3/04164; G06F 3/0443; G06F 3/0448; H01Q 1/2266; H01Q 1/243; H01Q 1/245; H01Q 1/44; H01Q 1/526; H01Q 21/08; H01Q 9/04
  USPC .................................. 345/156–174
  See application file for complete search history.

(56) References Cited

U.S. PATENT DOCUMENTS

| | | | |
|---|---|---|---|
| 8,933,906 B2 * | 1/2015 | Frey | H05K 1/0306 |
| | | | 345/174 |
| 2017/0322674 A1 * | 11/2017 | Rosenberg | G06F 3/04146 |
| 2017/0365908 A1 * | 12/2017 | Hughes | G02F 1/163 |

(Continued)

FOREIGN PATENT DOCUMENTS

| CN | 103515693 A | * | 1/2014 | .............. H01Q 1/24 |
|---|---|---|---|---|
| JP | H10-209749 | | 8/1998 | |

(Continued)

*Primary Examiner* — Kwin Xie
(74) *Attorney, Agent, or Firm* — F. Chau & Associates, LLC

(57) ABSTRACT

The present disclosure provides a display device. The display device includes a display panel, an active area, a peripheral area, an input sensor, and a pattern layer. The active area and the peripheral area are adjacent to the active area. The input sensor is disposed on the display panel and includes a plurality of detection electrodes and a first pattern. The pattern layer is disposed on the input sensor and includes a second pattern overlapping the first pattern when viewed on a plane. Any one of the first and second patterns transmits and receives a signal. The other pattern of the first and second patterns includes a shielding component that shields or reflects a signal provided from any one pattern. A transmission component transmits the signal.

18 Claims, 16 Drawing Sheets

(56) References Cited

U.S. PATENT DOCUMENTS

| | | |
|---|---|---|
| 2019/0267713 A1 | 8/2019 | Jeong et al. |
| 2020/0117241 A1* | 4/2020 | Yoshizumi .......... H04M 1/0268 |
| 2021/0135337 A1 | 5/2021 | Kim et al. |

FOREIGN PATENT DOCUMENTS

| | | | |
|---|---|---|---|
| KR | 10-1940797 | 1/2019 | |
| KR | 10-1962821 | 7/2019 | |
| KR | 10-2021-0053374 | 5/2021 | |
| WO | WO-2015147635 A1 * | 10/2015 | ............... H01Q 1/48 |

* cited by examiner

Radiation Pattern[Radiation, 28GHz]

RADIO FREQUENCY DEVICE AND DISPLAY DEVICE INCLUDING THE SAME

CROSS-REFERENCE TO RELATED APPLICATIONS

This U.S. non-provisional patent application claims priority under 35 U.S.C. § 119 of Korean Patent Application No. 10-2020-0014965, filed on Feb. 7, 2020, the entire contents of which are hereby incorporated by reference.

BACKGROUND

The present disclosure herein relates to a radio frequency device and a display device including the same.

Display devices may be used to convey information to a user or between multiple users. Smartphones, computers, televisions, and navigation units are examples of display devices. Display devices may contain display panels that provide visual information to a user, as well as various electronic modules such as an antenna, a camera, or a battery.

As demand for thinner, lighter, and more convenient electronic devices rises, display devices may decrease in size. The size of the electronic modules inside the electronic devices then may also be reduced accordingly. Additionally, the functions and specifications of the electronic device may be increased, as well as the quantity of electronic or antenna modules in the electronic device.

That is, electronic devices are becoming smaller and more functional. As a result, there is a need in the art for systems and methods of reducing the size of electronic modules while maintaining the effectiveness of the modules.

SUMMARY

The present disclosure provides a radio frequency device with increased antenna efficiency and a display device including the same.

An embodiment of the inventive concept provides a display device including: a display panel with an active area and a peripheral area adjacent to the active area; an input sensor disposed on the display panel and including a plurality of detection electrodes and a first pattern; and a pattern layer disposed on the input sensor and including a second pattern overlapping the first pattern when viewed on a plane, wherein one pattern of the first pattern and the second pattern transmits and receives a signal, and another pattern of the first pattern and the second pattern comprises: a shielding component that shields or reflects a signal provided from the one pattern; and a transmission component that transmits the signal.

In an embodiment, the other pattern may be floated. In an embodiment, when viewed on the plane, the first pattern and the second pattern may overlap the active area. In an embodiment, the shielding component may include a conductive material, and the transmission component includes a dielectric.

In an embodiment, a width in a first direction of the one pattern may be the same as a width in the first direction of the other pattern. In an embodiment, a width of a second direction intersecting the first direction of the one pattern may be the same as a width of the second direction of the other pattern. In an embodiment, when viewed on the plane, a first center point of the one pattern may overlap a second center point of the other pattern.

In an embodiment, when viewed on the plane, the second center point of the other pattern may be a value obtained by parallel-moving by a first distance in the first direction and by a second distance in the second direction from a first center point of the one pattern, wherein the first distance may be smaller than the width in the first direction of the one pattern, and the second distance may be smaller than the width in the second direction of the one pattern.

In an embodiment, a width in a first direction of the one pattern may be n times a width in the first direction of the other pattern, wherein n may be a positive integer greater than 1. In an embodiment, a width in a second direction intersecting the first direction of the one pattern may be m times a width in the second direction of the other pattern, wherein m may be a positive integer greater than 1.

In an embodiment, the other pattern may be provided in plural, wherein the plurality of other patterns may be arranged along the first direction and the second direction. In an embodiment, when viewed on the plane, k patterns among the plurality of other patterns may overlap the one pattern, wherein k may be the product of n and m. In an embodiment, when viewed on the plane, a first center point of the one pattern may overlap a second center point of the area where the k patterns are arranged.

In an embodiment, when viewed on the plane, a second center point of an area where the k patterns are disposed may be a value obtained by parallel-moving by a first distance in the first direction and by a second distance in the second direction from a first center point of the one pattern, wherein the first distance may be smaller than the width in the first direction of the one pattern, and the second distance may be smaller than the width in the second direction of the one pattern.

In an embodiment, wherein when viewed on the plane, an area of the shielding component may be less than or equal to an area of the transmission component. In an embodiment, when viewed on the plane, the shielding component may surround the transmission component. In an embodiment, when viewed on the plane, the transmission component may surround the shielding component. In an embodiment, the one pattern may include an antenna pattern.

In an embodiment of the inventive concept, a radio frequency device includes: a base layer; an antenna pattern disposed on the base layer; a shielding component disposed on a different layer from the antenna pattern, overlapping the antenna pattern when viewed on a plane, and electrically floated; and a transmission component adjacent to the shielding component, wherein the shielding component shields or reflects a signal provided from the antenna pattern, and the transmission component transmits the signal. In an embodiment, the shielding component may include a conductive material, and the transmission component includes a dielectric.

According to an embodiment of the inventive concept, an electronic device may include a plurality of antennas on one layer of a semiconductor device, and a plurality of shielding patterns on another layer of the semiconductor device. Each of the shielding patterns may correspond to and overlap one of the antennas, and may be configured to shield a portion of a signal transmitted to or from the antenna, thereby increasing the directivity of the antenna. Each of the shielding patterns may include a shielding component that conducts electricity and a transmission part that transmits electromagnetic signals.

BRIEF DESCRIPTION OF THE FIGURES

The accompanying drawings are included to provide a further understanding of the inventive concept, and are incorporated in and constitute a component of this specification. The drawings illustrate exemplary embodiments of the inventive concept and, together with the description, serve to explain principles of the inventive concept. In the drawings.

DETAILED DESCRIPTION

Figure 1:
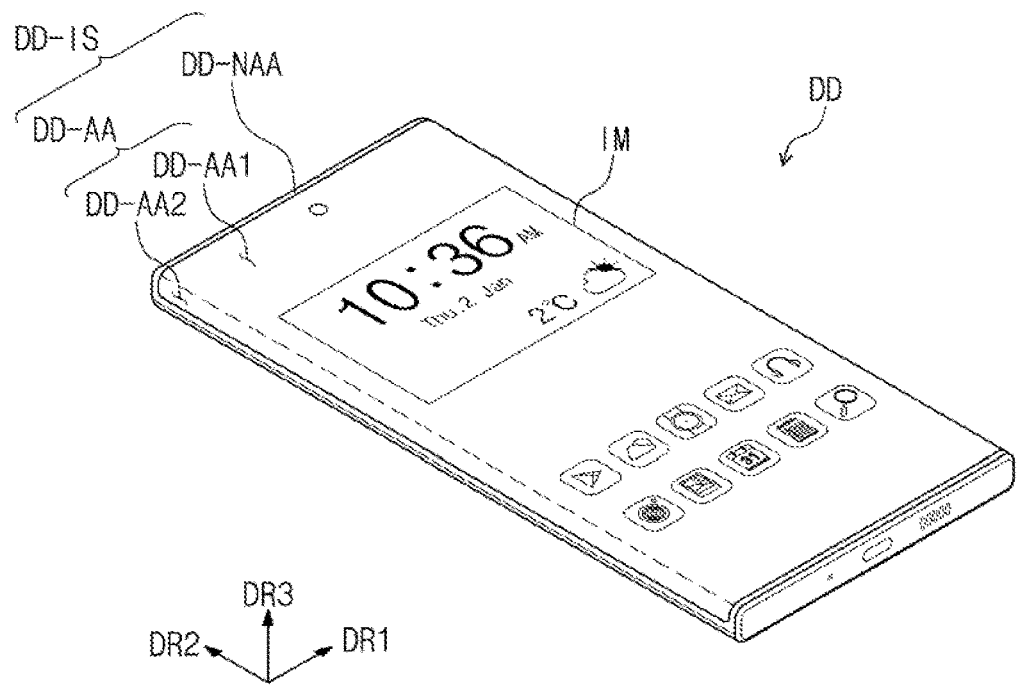
FIG. 1 is a perspective view of a display device according to an embodiment of the inventive concept.

The present disclosure relates generally to a display device. More particularly, to a display device with increased antenna efficiency. Specifically, embodiments of the present disclosure provide shielding around antenna components to direct the energy transmitted to/from the antenna and to protect the antenna from interference.

With mobile devices becoming smaller, the space used for electronic modules is becoming smaller as well. Additionally, as these devices provide more complex and powerful features, the quantity of electronic modules used in the devices increases to maintain an acceptable performance level. As the electronic modules become more compressed within a device, noise from some components can interfere with the operation of radio antennas.

Accordingly, embodiments of the present disclosure include a display panel, an active area, a peripheral area, an input sensor, and a pattern layer. The active area and the peripheral area are adjacent to the active area. The input sensor is disposed on the display panel and includes a plurality of detection electrodes and a first pattern. The pattern layer is disposed on the input sensor and includes a second pattern overlapping the first pattern when viewed on a plane. Any one of the first and second patterns transmits and receives a signal. The other pattern of the first and second patterns includes a shielding component that shields or reflects a signal provided from one pattern. A transmission component transmits the signal.

Additional embodiments of the present disclosure use the shielding component to shield or reflect a signal from an antenna pattern. The transmission component may transmit a signal provided by the antenna pattern. An additional pattern may shield or reflect a portion of the signal and transmit another portion of the signal. The additional pattern may modify the signal provided from the antenna pattern. The modified signal may improve antenna gain and directivity of the antenna signal of the display device. As a result, the present disclosure provides the display device with improved antenna efficiency.

In this specification, when the present disclosure mentions that a component (or, an area, a layer, a component, etc.) is referred to as being "on", "connected to" or "combined to" another component, this means that the component may be directly on, connected to, or combined to the other component or a third component therebetween may be present.

Like reference numerals refer to like elements. Additionally, in the drawings, the thicknesses, proportions, and dimensions of components are exaggerated for effective description. "And/or" includes all of one or more combinations defined by related components.

It will be understood that the terms "first" and "second" are used herein to describe various components but these components should not be limited by these terms. The above terms are used to distinguish one component from another. For example, a first component may be referred to as a second component and vice versa without departing from the scope of the inventive concept. The terms of a singular form may include plural forms unless otherwise specified.

Additionally or alternatively, terms such as "below", "the lower side", "on", and "the upper side" are used to describe a relationship of configurations shown in the drawing. The terms are described as a relative concept based on a direction shown in the drawing.

Unless otherwise defined, all terms (including technical and scientific terms) used herein have the same meaning as terms commonly understood by those skilled in the art to which this invention belongs. In general, the terms defined in the dictionary should be considered to have the same meaning as the contextual meaning of the related art, and, unless clearly defined herein, should not be understood abnormally or with an excessively formal meaning.

In various embodiments of the inventive concept, the term "include," "comprise," "including," or "comprising," specifies a property, a region, a fixed number, a step, a process, an element and/or a component but does not exclude other properties, regions, fixed numbers, steps, processes, elements and/or components.

Hereinafter, another embodiment of the inventive concept will be described with reference to the drawings.

FIG. 1 is a perspective view of a display device according to an embodiment of the inventive concept.

Referring to FIG. 1, the display device DD may be a device activated according to an electrical signal. For example, the display device DD may be a mobile phone, a tablet, a car navigation system, a game console, or a wearable device, but is not limited thereto. In FIG. 1, the display device DD is a mobile phone by way of example.

The display device DD may display an image IM through a display surface DD-IS. The display surface DD-IS may include an active area DD-AA and a peripheral area DD-NAA adjacent to the active area DD-AA. The peripheral area DD-NAA may be an area where the image IM is not displayed. The Image IM can include still images as well as dynamic images. FIG. 1 shows icon images as an example of the image IM. The second active area DD-AA2 extending from the first active area DD-AA1 may be defined in the active area DD-AA. A component of the first active area DD-AA1 may be defined in one of the bending areas of the active area DD-AA. The second active area DD-AA2 may be defined in the remaining area among the bending areas of the active area DD-AA. However, this is exemplary and the first active area DD-AA1 and the second active area DD-AA2 according to an embodiment of the inventive concept are not limited thereto. For example, the bending area of the active area DD-AA may be defined as the second active area DD-AA2.

The first active area DD-AA1 may be parallel to a surface defined by the first direction DR1 and the second direction DR2 intersecting the first direction DR1. The normal direction of the first active area DD-AA1, for example, the thickness direction of the display device DD, may be indicated by the third direction DR3.

The front surface and the back surface of each of the members or units described below may be distinguished by the third direction DR3. The front surface may be considered the upper surface and the back surface may be considered the lower surface. The third direction DR3 may be a direction intersecting the first direction DR1 and the second direction DR2. For example, the first direction DR1, the second direction DR2, and the third direction DR3 may be orthogonal to each other. Additionally or alternatively, a surface defined by the first direction DR1 and the second direction DR2 is defined as a plane, and "viewing on the plane" can be defined as viewed in the third direction DR3.

The second active area DD-AA2 may be provided extending from one side of the first active area DD-AA1. The second active area DD-AA2 may be provided in plural. In this case, the second active area DD-AA2 may be provided extending from at least two sides of the first active area DD-AA1. The active area DD-AA may include one first active area DD-AA1 and one or more and four or less second active areas DD-AA2. However, this is exemplary and the active area DD-AA, according to an embodiment of the inventive concept, is not limited thereto.

Figure 2:
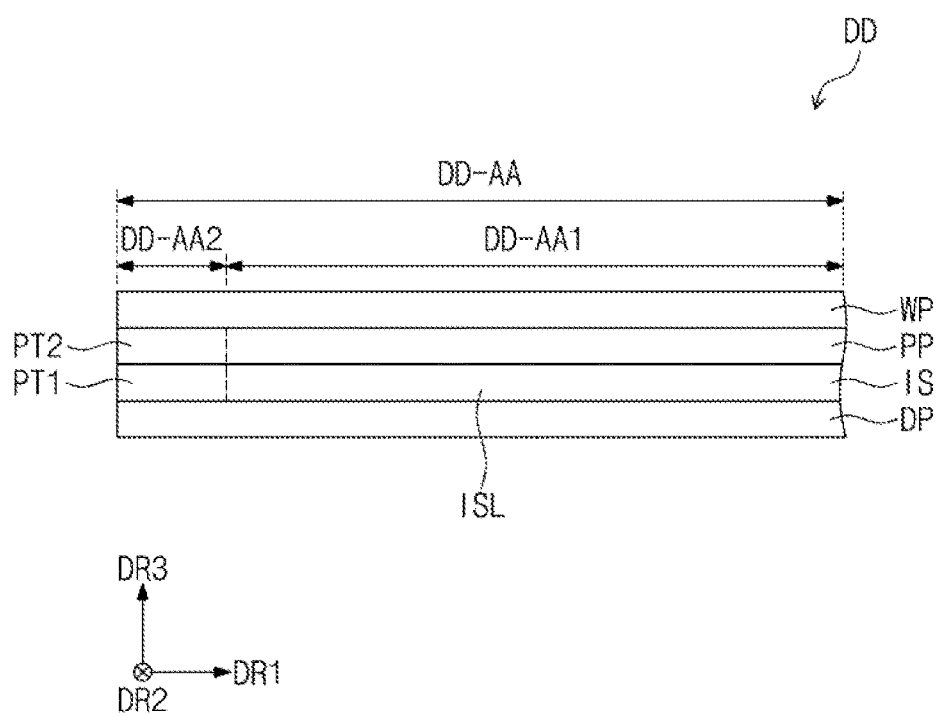
FIG. 2 is a cross-sectional view of a display device according to an embodiment of the inventive concept.

FIG. 2 is a cross-sectional view of a display device according to an embodiment of the inventive concept.

Referring to FIG. 2, the display device DD may include a display panel DP, an input sensor IS, a pattern layer PP, and a window WP.

The display panel DP may be configured to generate the image IM (see FIG. 1). The display panel DP may be a light-emitting display panel, and is not particularly limited. For example, the display panel DP may be an organic light-emitting display panel or a quantum dot light-emitting display panel. In the organic light-emitting display panel, the light-emitting layer may include an organic light-emitting material. The light-emitting layer of the quantum dot light-emitting display panel may include a quantum dot and a quantum rod. Hereinafter, the display panel DP is described as the organic light-emitting display panel.

The input sensor IS may be disposed on the display panel DP. When viewed on a plane, the input sensor IS may overlap the active area DD-AA. The input sensor IS may be formed on the display panel DP through a continuous process. Alternatively, one or more input sensors IS may be coupled to the display panel DP through an adhesive member. The adhesive member may include a conventional adhesive or an adhesive. For example, the adhesive member may be a transparent adhesive member such as a Pressure Sensitive Adhesive (PSA) film, an Optically Clear Adhesive (OCA) film, or an Optically Clear Resin (OCR).

The input sensor IS may include an input detection unit ISL and a first pattern PT1. The input detection unit ISL may detect an external input applied from the outside. The external input may be a user input. The user input may include various types of external inputs such as a component of the user's body, light, heat, pen, or pressure. The input sensor may include a pressure sensor, a resistive sensor, an acoustic sensor, a capacitive sensor, an infrared grid, an optical sensor, a piezoelectric sensor, or another suitable touch sensor. When viewed on a plane, the input detection unit ISL may overlap the first active area DD-AA1.

The first pattern PT1 may overlap the second active area DD-AA2 when viewed on a plane. Even if the display device DD is downsized or thinned or the area of the peripheral area DD-NAA (see FIG. 1) is decreased a space where the first pattern PT1 is to be arranged can be secured since the area of the active area DD-AA is secured.

The pattern layer PP may be disposed on the input sensor IS. The pattern layer PP may include a second pattern PT2. When viewed on a plane, the second pattern PT2 may overlap the second active area DD-AA2. When viewed on a plane, the second pattern PT2 may overlap the first pattern PT1.

One of the first pattern PT1 and the second pattern PT2 may be configured to transmit, receive, or transceive a radio communication signal, for example, a radio frequency signal. For example, one of the patterns may include a plurality of antenna patterns. The plurality of antenna patterns may transmit, receive, or transceive the same frequency band, or transmit, receive, or transceive different frequency bands. The other pattern may transform a signal radiated from the antenna pattern. In some embodiments, the first pattern PT1 and the second pattern PT2 may be referred to as a radio frequency device.

The window WP may be disposed on the pattern layer PP. The window WP may include an optically transparent insulating material. For example, the window WP may include glass or plastic. The window WP may have a multi-layer structure or a single-layer structure. For example, the window WP may include a plurality of plastic films bonded together with an adhesive, or may include a glass substrate and a plastic film bonded together with an adhesive.

Figure 3:
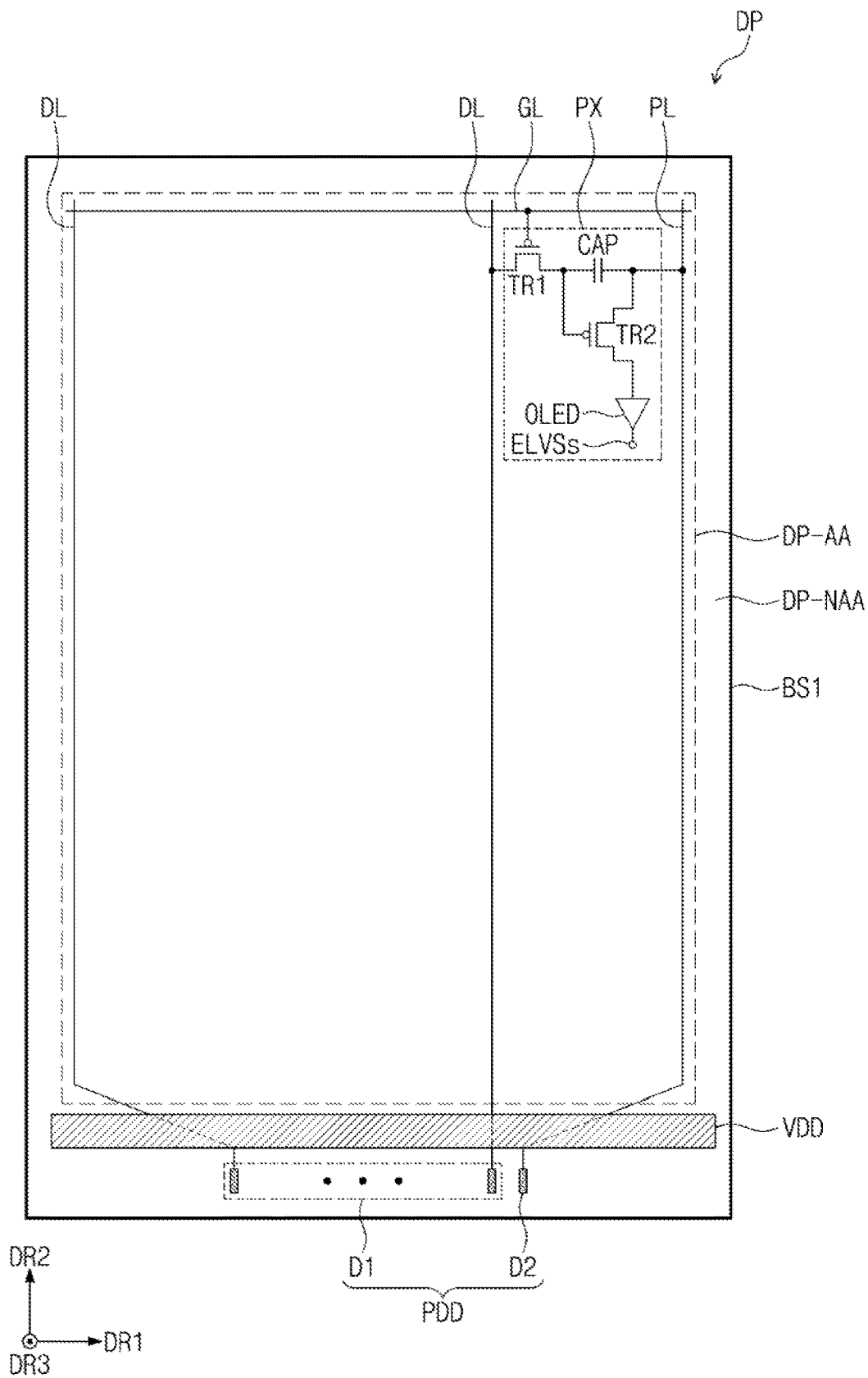
FIG. 3 is a plan view of a display panel according to an embodiment of the inventive concept.

FIG. 3 is a plan view of a display panel according to an embodiment of the inventive concept.

Referring to FIG. 3, an active area DP-AA and a peripheral area DP-NAA may be defined in the display panel DP. The active area DP-AA may be an area activated according to an electrical signal. For example, the active area DP-AA may be an area displaying the image IM (see FIG. 1). The peripheral area DP-NAA may surround the active area DP-AA. A driving circuit or a driving line for driving the active area DP-AA may be disposed in the peripheral area DP-NAA. The active area DP-AA may be an area corresponding to the active area DD-AA (see FIG. 1) of the display device DD (see FIG. 1). The peripheral area DP-NAA may be an area corresponding to the peripheral area DD-NAA (see FIG. 1) of the display device DD (see FIG. 1).

The display panel DP may include a base layer BS1, a plurality of pixels PX, a plurality of signal lines DL, GL, and PL, a power pattern VDD, and a plurality of display pads PDD.

The base layer BS1 may include a synthetic resin film. The synthetic resin film may include a thermosetting resin. The base layer BS1 may have a multi-layer structure. For example, the base layer BS1 may have a three-layer structure of a synthetic resin layer, an adhesive layer, and a synthetic resin layer. The synthetic resin layer may include at least one of polyimide resin, acrylic resin, methacrylic resin, polyisoprene, vinyl resin, epoxy resin, urethane resin, cellulose resin, siloxane resin, polyamide resin, and perylene resin but is not particularly limited. Alternatively, the base layer BS1 may include a glass substrate or an organic/inorganic composite material substrate.

The plurality of signal lines DL, GL, and PL may be electrically connected to the plurality of pixels PX to transmit electrical signals to the plurality of pixels PX. FIG. 3 exemplarily shows that the plurality of signal lines DL, GL, and PL include a data line DL, a scan line GL, and a power line PL. However, this is an example. Therefore, the plurality of signal lines DL, GL, and PL according to an embodiment of the inventive concept may further include at least one of an initialization voltage line and a light emission control line, and are not limited to any one embodiment.

The plurality of pixels PX may be disposed in the active area DP-AA. In this embodiment, an equivalent circuit diagram of one pixel PX is enlarged and illustrated. The pixel PX may include a first transistor TR1, a second transistor TR2, a capacitor CAP, a light-emitting element OLED, and a power terminal ELVSS.

The first transistor TR1 may be a switching element for controlling ON-OFF of the pixel PX. The first transistor TR1 may transmit or block a data signal transmitted through the data line DL in response to a scan signal transmitted through the scan line GL.

The capacitor CAP may be connected to the first transistor TR1 and the power line PL. The capacitor CAP may charge an amount of charge corresponding to a difference between the data signal transmitted from the first transistor TR1 and the first power signal applied to the power line PL.

The second transistor TR2 may be connected to the first transistor TR1, the capacitor CAP, and the light-emitting element OLED. The second transistor TR2 may control a driving current flowing through the light-emitting element OLED in response to the amount of charge stored in the capacitor CAP. The turn-on time of the second transistor TR2 may be determined according to the amount of charge charged in the capacitor CAP. The second transistor TR2 may provide the first power signal to be transmitted through the power line PL during the turn-on time to the light-emitting element OLED.

The light-emitting element OLED can generate light or control the amount of light according to an electrical signal. For example, the light-emitting element OLED may include an organic light-emitting element or a quantum dot light-emitting element.

The light-emitting element OLED is connected to a power terminal ELVSS and receives a second power signal different from the first power signal provided by the power line PL. A driving current corresponding to the difference between the electrical signal provided from the second transistor TR2 and the second power signal may flow in the light-emitting element OLED, and the light-emitting element OLED may generate light corresponding to the driving current. Meanwhile, this is illustrated by way of example, and the pixel PX may include electronic components with various configurations and arrangements, and is not limited to any one embodiment.

The power pattern VDD may be disposed in the peripheral area DP-NAA. The power pattern VDD may be electrically connected to a plurality of power lines PL. The display panel DP may provide the first power signal with substantially the same level to the plurality of pixels PX by including the power pattern VDD.

The plurality of display pads PDD may include a first pad D1 and a second pad D2. The plurality of first pads D1 may be provided and connected to the data lines DL, respectively. The second pad D2 may be connected to the power pattern VDD and electrically connected to the power line PL. The display panel DP may provide electrical signals provided from the outside to the plurality of pixels PX through the plurality of display pads PDD. Meanwhile, the plurality of display pads PDD may further include pads for receiving electrical signals other than the first pads D1 and the second pads D2 and are not limited to any one embodiment.

Figure 4:
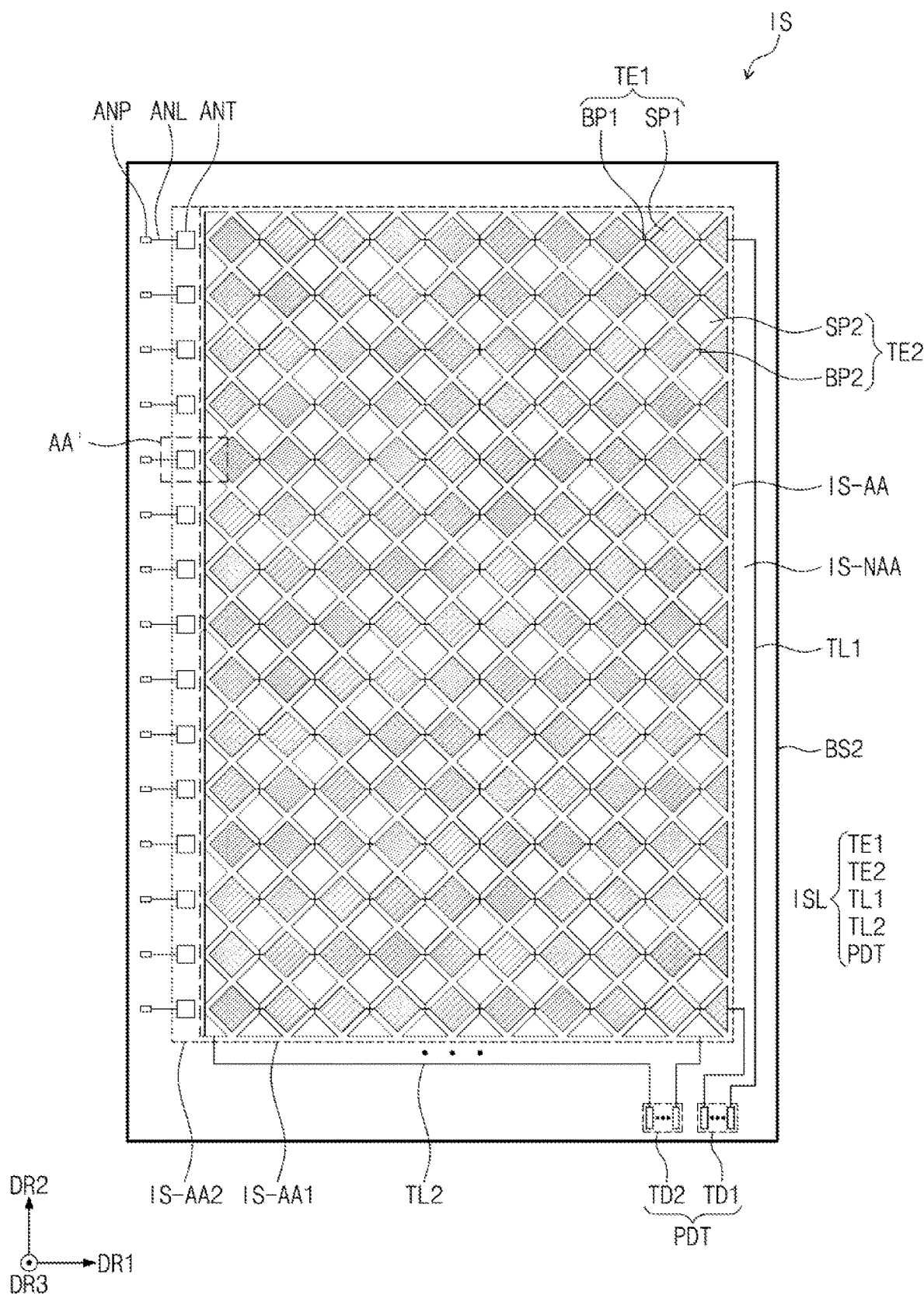
FIG. 4 is a plan view of an input sensor according to an embodiment of the inventive concept.

FIG. 4 is a plan view of an input sensor according to an embodiment of the inventive concept.

Referring to FIG. 4, an active area IS-AA and a peripheral area IS-NAA may be defined in the input sensor IS. The active area IS-AA may be an area activated according to an electrical signal. For example, the active area IS-AA may be an area that detects an input. The active area IS-AA may be an area corresponding to the active area DD-AA of the display device DD (see FIG. 1). When viewed on a plane, the active area IS-AA may overlap the active area DP-AA (see FIG. 3) of the display panel DP (see FIG. 3).

The active area IS-AA may include a first active area IS-AA1 and a second active area IS-AA2. The first active area IS-AA1 may be an area corresponding to the first active area DD-AA1 (see FIG. 1) of the display device DD (see FIG. 1). The second active area IS-AA2 may be an area corresponding to the second active area DD-AA2 (see FIG. 1) of the display device DD (see FIG. 1).

The peripheral area IS-NAA may surround the active area IS-AA. The peripheral area IS-NAA may be an area corresponding to the peripheral area DD-NAA (see FIG. 1) of the display device DD (see FIG. 1). When viewed on a plane, the peripheral area IS-NAA may overlap the peripheral area DP-NAA of the display panel DP (see FIG. 3).

The input sensor IS may include a base insulating layer BS2, an input detection unit ISL, a plurality of antenna patterns ANT, a plurality of antenna lines ANL, and a plurality of antenna pads ANP. The base insulating layer BS2 may be an inorganic layer including any one of silicon nitride, silicon oxynitride, and silicon oxide. Alternatively, the base insulating layer BS2 may be an organic layer including an epoxy resin, an acrylic resin, or an imide-based resin. The base insulating layer BS2 may be directly formed on the display panel DP (see FIG. 2). Alternatively, the base insulating layer BS2 may be one component of the display panel DP (see FIG. 2). Additionally or alternatively, the base insulating layer BS2 is formed on a separate base layer, and the base layer may be coupled to the display panel DP (see FIG. 2) through an adhesive member.

The input detection unit ISL may include a plurality of first detection electrodes TE1, a plurality of second detection electrodes TE2, a plurality of detection lines TL1 and TL2, and a plurality of detection pads PDT. The plurality of first detection electrodes TE1 and the plurality of second detection electrodes TE2 may be disposed in the first active area IS-AA1. The plurality of detection lines TL1 and TL2 and the plurality of detection pads PDT may be disposed in the peripheral area IS-NAA.

The input detection unit ISL may obtain information on an external input from a change in capacitance between the plurality of first detection electrodes TE1 and the plurality of second detection electrodes TE2.

The plurality of first detection electrodes TE1 may be disposed on the base insulating layer BS2. Each of the plurality of first detection electrodes TE1 may extend along the first direction DR1 and may be arranged along the second direction DR2. Each of the plurality of first detection electrodes TE1 may include a plurality of first detection patterns SP1 and a plurality of first connection patterns BP1. Each of the plurality of first connection patterns BP1 may electrically connect two first detection patterns SP1 adjacent to each other.

The plurality of second detection electrodes TE2 may be disposed on the base insulating layer BS2. Each of the plurality of second detection electrodes TE2 may extend along the second direction DR2 and may be arranged along the first direction DR1. Each of the plurality of second detection electrodes TE2 may include a plurality of second detection patterns SP2 and a plurality of second connection patterns BP2. Each of the plurality of second connection patterns BP2 may electrically connect two second detection patterns SP2 adjacent to each other.

The plurality of detection lines TL1 and TL2 may include a plurality of first detection lines TL1 and a plurality of second detection lines TL2. The plurality of first detection lines TL1 may be respectively electrically connected to the plurality of first detection electrodes TEL The plurality of second detection lines TL2 may be respectively electrically connected to the plurality of second detection electrodes TE2.

The plurality of detection pads PDT may include a plurality of first detection pads TD1 and a plurality of second detection pads TD2. The plurality of first detection pads TD1 may be respectively connected to the plurality of first detection lines TL1. The plurality of second detection pads TD2 may be respectively connected to the plurality of second detection lines TL2.

The plurality of antenna patterns ANT may be disposed in the second active area IS-AA2, and the plurality of antenna pads ANP may be disposed in the peripheral area IS-NAA. The plurality of antenna lines ANL may electrically connect the plurality of antenna patterns ANT and the plurality of antenna pads ANP. The first pattern PT1 (see FIG. 2) may be a plurality of antenna patterns ANT.

The plurality of antenna patterns ANT may be disposed on the same layer as the plurality of detection electrodes TE1 and TE2. For example, the plurality of antenna patterns ANT may be disposed on the base insulating layer BS2.

The plurality of antenna patterns ANT may include the same material as the plurality of detection electrodes TE1 and TE2. The plurality of antenna patterns ANT may be formed through the same process as the plurality of detection electrodes TE1 and TE2. For example, the plurality of detection electrodes TE1 and TE2 and the plurality of antenna patterns ANT may include a carbon nanotube, a metal and/or metal alloy, or a composite material thereof, and may have a single-layer or multi-layer structure. However, this is an example.

Therefore, the plurality of antenna patterns ANT, according to an embodiment of the inventive concept, may include a different material than the plurality of detection electrodes TE1 and TE2 and may be formed through a separate process. For example, the plurality of detection electrodes TE1 and TE2 may have a multi-layer structure where titanium (Ti), aluminum (Al), and titanium (Ti) are sequentially stacked, and the plurality of antenna patterns ANT may include carbon nanotubes, metal and/or metal alloys, or composite materials thereof, and may have a single layer or multi-layer structure. For example, the metal material may be silver (Ag), copper (Cu), aluminum (Al), gold (Au), or platinum (Pt), but is not limited thereto.

When viewed on a plane, the plurality of antenna patterns ANT may overlap the active area DP-AA (see FIG. 3) of the display panel DP (see FIG. 3). The plurality of antenna patterns ANT may have a mesh structure so that the image IM (see FIG. 1) provided in the active area DP-AA (see FIG. 3) can be transmitted. The mesh structure may mean a structure where a plurality of openings are defined in a given layer. The plurality of antenna patterns ANT may be modified in various shapes within the second active area IS-AA2, and design freedom of the plurality of antenna patterns ANT may be increased.

The plurality of antenna lines ANL includes the same material as the plurality of antenna patterns ANT, and may be formed through the same process. The plurality of antenna lines ANL may respectively extend from the plurality of antenna patterns ANT toward the peripheral area IS-NAA.

The plurality of antenna pads ANP may be electrically connected to the plurality of antenna lines ANL.

The input sensor IS may further include at least one ground electrode disposed under the base insulating layer BS2. However, this is exemplary and the ground electrode, according to an embodiment of the inventive concept, is not limited thereto. For example, the ground electrode according to an embodiment of the inventive concept may be a component of the configuration of the display panel DP (see FIG. 3).

Figure 5:
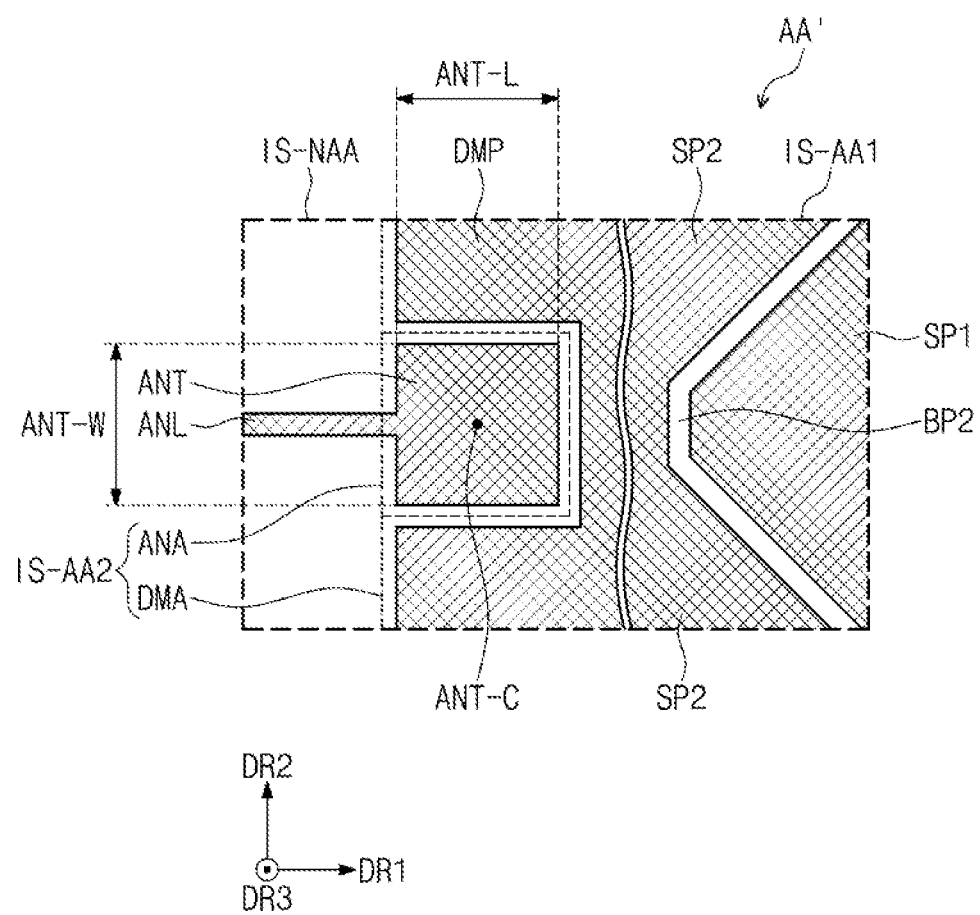
FIG. 5 is an enlarged plan view of area AN of FIG. 4 according to an embodiment of the inventive concept.

FIG. 5 is an enlarged plan view of area AA' of FIG. 4 according to an embodiment of the inventive concept.

Referring to FIGS. 4 and 5, the input sensor IS may further include a dummy pattern DMP.

A first active area IS-AA1 where a plurality of first detection electrodes TE1 and a plurality of second detection electrodes TE2 are disposed, a second active area IS-AA2 including an antenna area ANA where one antenna pattern ANT is disposed among a plurality of antenna patterns and a dummy area DMA where a dummy pattern DMP is disposed, and a peripheral area IS-NAA where the plurality of antenna lines ANL are disposed may be defined in the input sensor IS.

The dummy pattern DMP may be disposed in the dummy area DMA between the first active area IS-AA1 and the antenna area ANA. As the dummy pattern DMP is disposed, a difference in reflectance between a portion where the antenna pattern ANT is disposed and a portion where the antenna pattern ANT is not disposed may be decreased. Therefore, the antenna pattern ANT may be prevented from being viewed from the outside. Additionally or alternatively, each of the reflectance and transmittance of the dummy area DMA may be different from each of the reflectance and transmittance of the first active area IS-AA1 and the antenna area ANA when the dummy pattern DMP is not disposed. However, as the dummy pattern DMP is disposed, a difference between the reflectance and a difference between the transmittance may be decreased. As a result, a phenomenon where a specific boundary such as a boundary between the antenna pattern ANT and the second detection pattern SP2, or a boundary between the antenna pattern ANT and the second connection pattern BP2 is viewed, may be prevented.

The antenna pattern ANT may have a first width ANT-L in the first direction DR1. The first width ANT-L of the antenna pattern ANT may have a value of ½ of the wavelength of the frequency of the signal transmitted and received by the antenna pattern ANT. However, this is exemplary and the first width ANT-L of the antenna pattern ANT, according to an embodiment of the inventive concept, is not limited thereto. For example, the first width ANT-L of the antenna pattern ANT may have a value of ¼ of the wavelength of the frequency of the signal transmitted and received by the antenna pattern ANT.

The antenna pattern ANT may have a second width ANT-W in the second direction DR2. The second width ANT-W of the antenna pattern ANT may be the same as the first width ANT-L of the antenna pattern ANT. However, this is exemplary and the first width ANT-L of the antenna pattern ANT and the second width ANT-W of the antenna pattern ANT according to an embodiment of the inventive concept are not limited thereto. For example, the first width ANT-L of the antenna pattern ANT and the second width ANT-W of the antenna pattern ANT, according to an embodiment of the inventive concept, may be different from each other.

The antenna pattern ANT may have a first center point ANT-C. The first center point ANT-C may be a point that becomes a center of an area where the antenna pattern ANT is disposed.

Figure 6:
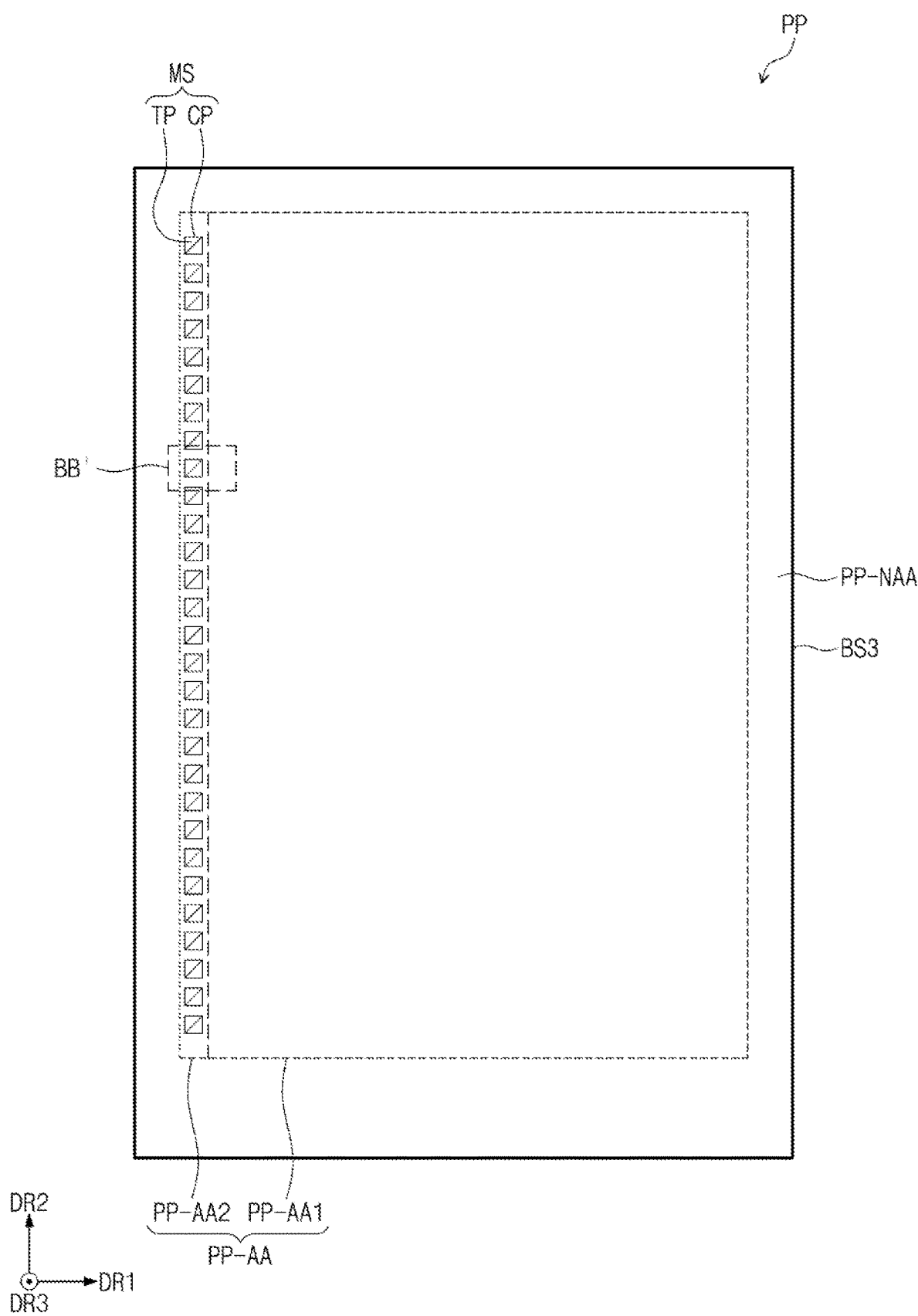
FIG. 6 is a plan view showing a pattern layer according to an embodiment of the inventive concept.
Figure 7A:
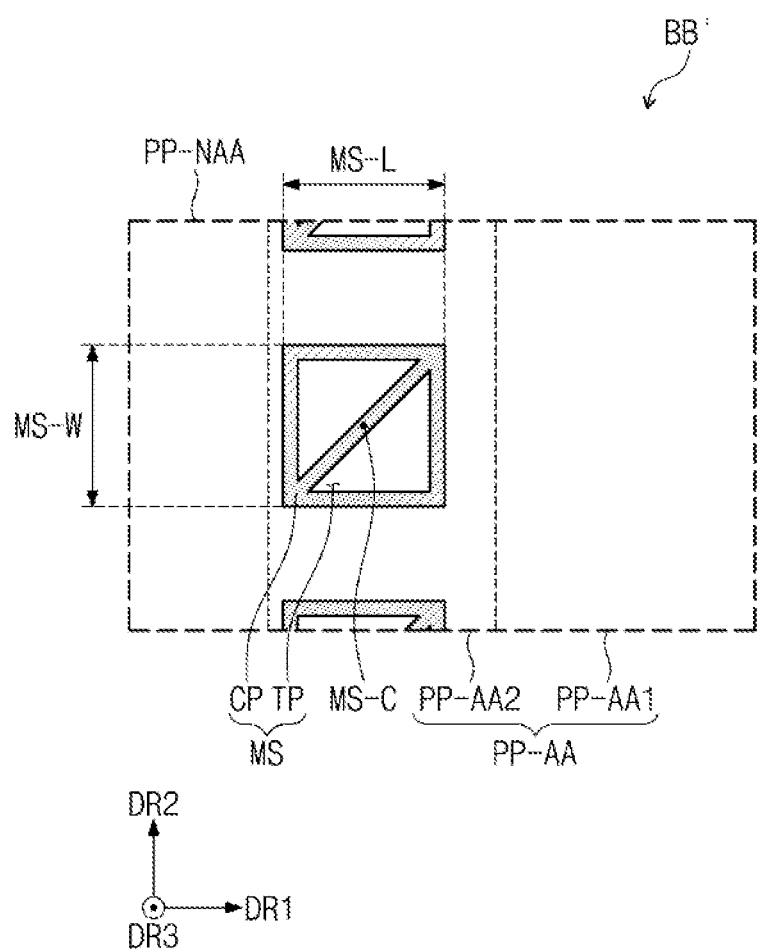
FIG. 7A is an enlarged plan view of area BB' of FIG. 6 according to an embodiment of the inventive concept.

FIG. 6 is a plan view showing a pattern layer according to an embodiment of the inventive concept, and FIG. 7A is a plan view showing an enlarged area BB' of FIG. 6 according to an embodiment of the inventive concept.

Referring to FIGS. 6 and 7A, the area BB' of the pattern layer PP may be an area corresponding to the area AN of the input sensor IS (see FIG. 4).

An active area PP-AA and a peripheral area PP-NAA may be defined in the pattern layer PP. The peripheral area PP-NAA may surround the active area PP-AA.

The active area PP-AA may include a first active area PP-AA1 and a second active area PP-AA2. The first active area PP-AA1 may be an area corresponding to the first active area DD-AA1 (see FIG. 1) of the display device DD (see FIG. 1). When viewed on a plane, the first active area PP-AA1 may overlap the active area DP-AA (see FIG. 3) of the display panel DP (see FIG. 3) and the first active area IS-AA1 (see FIG. 4) of the input sensor IS (see FIG. 4).

The second active area PP-AA2 may be an area corresponding to the second active area DD-AA2 (see FIG. 1) of the display device DD (see FIG. 1). When viewed on a plane, the second active area PP-AA2 may overlap the active area DP-AA of the display panel DP (see FIG. 3) and the second active area IS-AA2 (see FIG. 4) of the input sensor IS (see FIG. 4).

The pattern layer PP may include a base layer BS3 and a plurality of additional patterns MS. The base layer BS3 may include an insulating material with a predetermined dielectric constant. The base layer BS3 may include a permeable film. For example, the base layer BS3 may include at least one of acrylic resin, methacrylic resin, polyisoprene, vinyl resin, epoxy resin, urethane resin, cellulose resin, siloxane resin, polyamide resin, and perylene resin.

The plurality of additional patterns MS may be disposed on the base layer BS3 and/or the second active area PP-AA2. The second pattern PT2 (see FIG. 2) may be a plurality of additional patterns MS. The plurality of additional patterns MS may be electrically floated. The term "floated" may refer to circuits that are not electronically connected. For example, the plurality of additional patterns MS may be floated with respect to each other, with respect to an electrical power source, or both.

One additional pattern MS of the plurality of additional patterns may have a first width MS-L in the first direction DR1.

The additional pattern MS may have a second width MS-W in the second direction DR2. The second width MS-W of the additional pattern MS may be the same as the first width MS-L. However, this is exemplary, and the first width MS-L of the additional pattern MS and the second width MS-W of the additional pattern MS are not limited thereto. For example, the first width MS-L of the additional pattern MS and the second width MS-W of the additional pattern MS according to an embodiment of the inventive concept may be different from each other.

The additional pattern MS may have a second center point MS-C. The second center point MS-C may be a point that becomes a center of an area where the additional pattern MS is disposed. Each of the plurality of additional patterns MS may include a shielding component CP and a transmission component TP.

The shielding component CP may include a conductive material. For example, the conductive material may include a polymer, carbon nanotube, graphene, carbon, metal and/or metal alloy, or a composite material thereof, and may have a single-layer or multi-layer structure. For example, the metal material may be silver (Ag), copper (Cu), aluminum (Al), gold (Au), or platinum (Pt), but is not limited thereto.

When viewed on a plane, the area of the shielding component CP may be smaller than the area of the additional pattern MS. For example, the shielding component CP may be between 10% and 50% of the area of the additional pattern MS.

The transmission component may be configured to transmit electromagnetic radiation. For example, the transmission component TP may include a dielectric. In some examples, the transmission component TP may have light transmission properties that make it transparent or translucent. When viewed on a plane, the area of the shielding component CP may be smaller than or equal to the area of the transmission component TP.

According to an embodiment of the inventive concept, the shielding component CP may shield the signal provided by the antenna pattern ANT (see FIG. 4). For example, in one embodiment, shielding component CP may reflect the signal. In another embodiment, shielding component CP may absorb the signal, or reduce the transmission of the signal in the area of the shielding component CP.

Thus, an electronic device may include a plurality of antennas (e.g., the antenna patterns ANT) on one layer of a semiconductor device, and a plurality of shielding patterns (e.g., the additional patterns MS) on another layer of the semiconductor device. Each of the shielding patterns may correspond to and overlap one of the antennas, and may be configured to shield a portion of a signal transmitted to or from the antenna, thereby increasing the directivity of the antenna. Each of the shielding patterns may include a shielding component that conducts electricity (thereby shielding electromagnetic signals) and a transmission part that transmits electromagnetic signals.

For example, the transmission component TP may transmit the signal provided by the antenna pattern ANT (see FIG. 4). The additional pattern MS may shield or reflect a portion of the signal and transmit another portion of the signal. The additional pattern MS may modify the signal provided from the antenna pattern ANT (see FIG. 4). The modified signal can increase the antenna gain and the directivity of the antenna of the display device DD (see FIG. 2). Accordingly, the display device DD (see FIG. 2) may be provided with increased antenna efficiency.

Figure 7B:
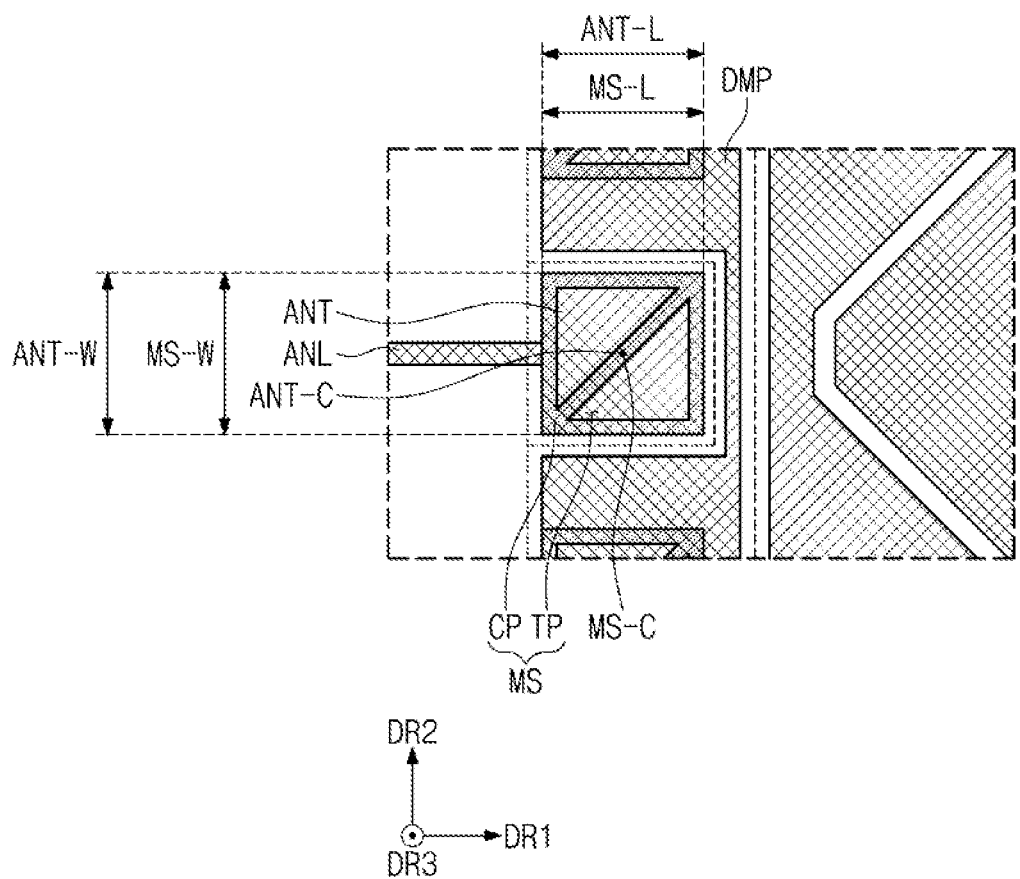
FIGS. 7B and 7C are enlarged plan views showing an area of an input sensor and a pattern layer according to an embodiment of the inventive concept.

FIG. 7B is an enlarged plan view showing an area of an input sensor and a pattern layer according to an embodiment of the inventive concept. In the description of FIG. 7B, the same reference numerals are given to the components described with reference to FIGS. 5 and 7A, and a description thereof will be omitted.

Referring to FIG. 7B, the first width MS-L of the additional pattern MS may be the same as the first width ANT-L of the antenna pattern ANT. The second width MS-W of the additional pattern MS may be the same as the second width ANT-W of the antenna pattern ANT.

When viewed on a plane, the antenna pattern ANT may overlap the additional pattern MS. When viewed on a plane, the second center point MS-C may overlap the first center point ANT-C.

According to an embodiment of the inventive concept, the additional pattern MS overlaps the antenna pattern ANT, and the shielding component CP may shield or reflect a portion of the signal provided by the antenna pattern ANT. The additional pattern MS may modify a portion of the signal provided from the antenna pattern ANT. The radiation pattern of the signal emitted by the antenna pattern ANT may be modified by the modified signal. The additional pattern MS may modify a portion of the signal provided from the antenna pattern ANT. Accordingly, the display device DD (see FIG. 2) may be provided with increased antenna efficiency.

Figure 7C:
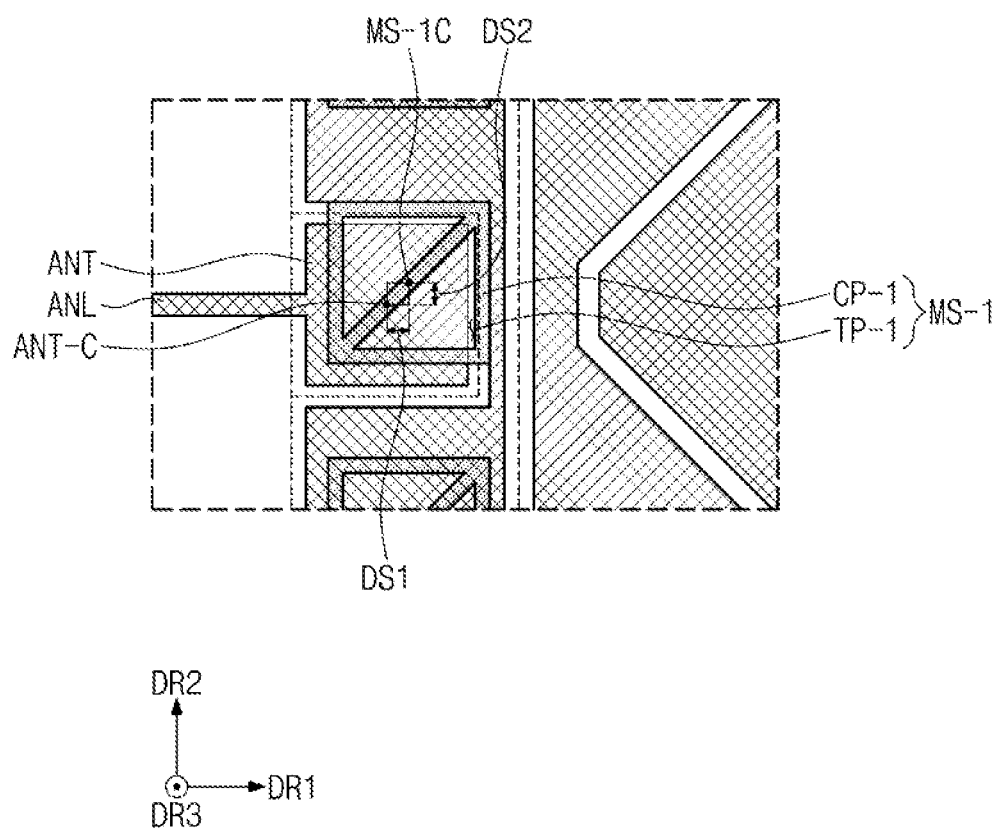

FIG. 7C is an enlarged plan view showing an area of an input sensor and a pattern layer according to an embodiment of the inventive concept. In the description of FIG. 7C, the same reference numerals are given to the components described with reference to FIGS. 5 and 7A, and a description thereof will be omitted.

Referring to FIG. 7C, when viewed on a plane, a portion of the additional pattern MS-1 may overlap the antenna pattern ANT, and another portion of the additional pattern MS-1 may non-overlap the antenna pattern ANT.

When viewed on a plane, the additional pattern MS-1 may have a second center point MS-1C. The second center point MS-1C may be a center point of an area where the additional pattern MS-1 is disposed.

When viewed on a plane, the second center point MS-1C may overlap a point moved in a parallel direction by the first distance DS1 in the first direction DR1 and by the second distance DS2 in the second direction DR2 from the first center point ANT-C of the antenna pattern ANT.

The first distance DS1 may be smaller than the first width ANT-L of the antenna pattern ANT. The second distance DS2 may be smaller than the second width ANT-W of the antenna pattern ANT.

According to an embodiment of the inventive concept, the shielding component CP-1 overlaps a portion of the antenna pattern ANT such that a portion of the signal provided by the antenna pattern ANT may be shielded or reflected. The additional pattern MS-1 may modify a portion of the signal provided from the antenna pattern ANT. The direction of the signal emitted by the antenna pattern ANT may be modified by the modified signal. The additional pattern MS-1 may control the direction of the signal emitted by the antenna pattern ANT. Accordingly, the display device DD (see FIG. 2) may be provided with increased antenna efficiency.

Figure 8:
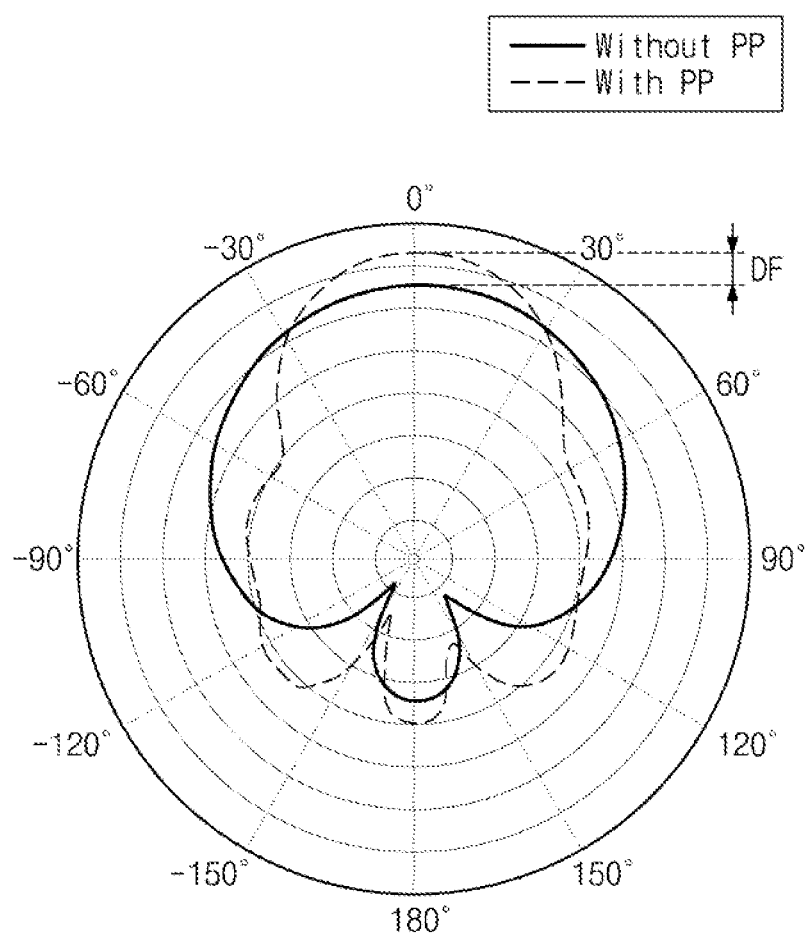
FIG. 8 shows a radiation pattern at 28 GHz of an antenna pattern according to an embodiment of the inventive concept.

FIG. 8 shows a radiation pattern at 28 GHz of an antenna pattern according to an embodiment of the inventive concept.

Referring to FIG. 8, a solid line shows a radiation pattern of a display device that does not include the pattern layer PP (see FIG. 2), and the dashed line shows the radiation pattern of the display device DD (see FIG. 2) including the pattern layer PP (see FIG. 2).

Referring to the dashed line of FIG. 8, the gain of the antenna may increase by a gain difference DF in a particular direction compared to the solid line. For example, the gain difference DF may be increased between −30° and 30°. In relation to the display device DD (see FIG. 2), the antenna gain and antenna directivity may be increased.

According to an embodiment of the inventive concept, the pattern layer PP (see FIG. 2) can modify the signal provided from the antenna pattern ANT (see FIG. 4). The modified signal can increase the antenna gain and the directivity of the antenna of the display device DD (see FIG. 2). Accordingly, the display device DD (see FIG. 2) may be provided with increased antenna efficiency.

Figure 9A:
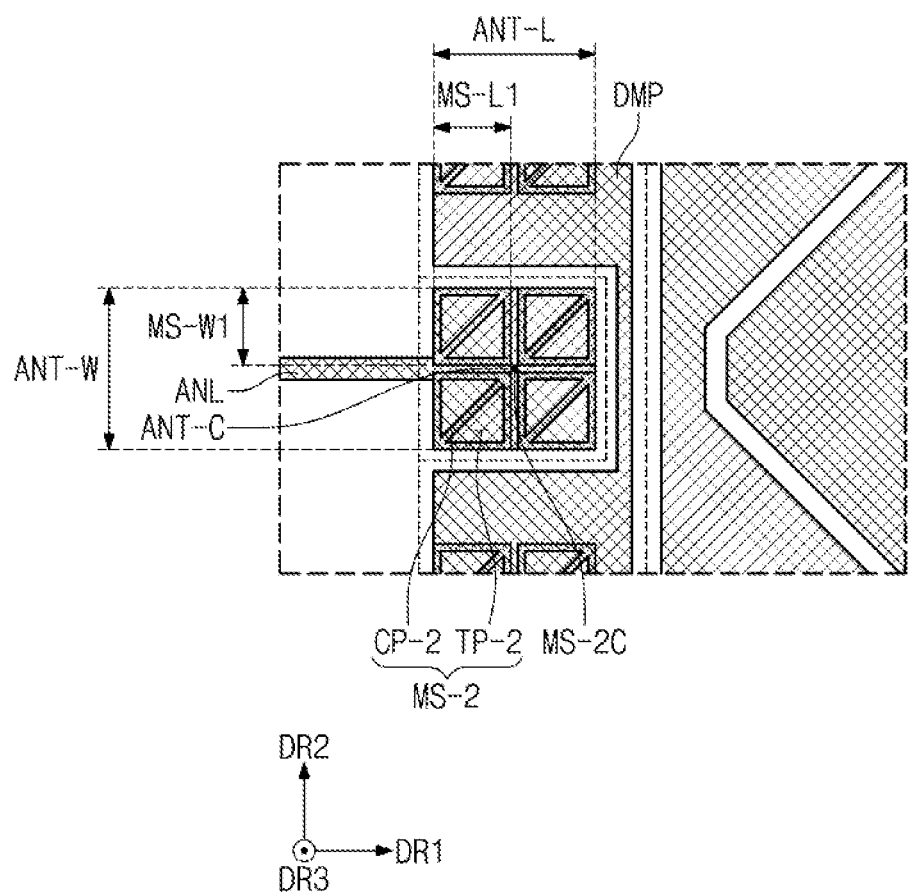
FIGS. 9A and 9B are enlarged plan views showing an area of an input sensor and a pattern layer according to an embodiment of the inventive concept.

FIG. 9A is an enlarged plan view showing an area of an input sensor and a pattern layer, according to an embodiment of the inventive concept. In the description of FIG. 9A, the same reference numerals are given to the components described with reference to FIGS. 5 and 7A, and a description thereof will be omitted.

Referring to FIG. 9A, the additional pattern MS-2 may have a first width MS-L1 in the first direction DR1. The first width ANT-L of the antenna pattern ANT may be n times the first width MS-L1 of the additional pattern MS-2. The above n may be a positive integer greater than 1. For example, FIG. 9 shows that n is 2.

The additional pattern MS-2 may have a second width MS-W1 in the second direction DR2. The second width MS-W1 of the additional pattern MS-2 may be the same as the first width MS-L1 of the additional pattern MS-2. However, this is exemplary, and the first width MS-L1 of the additional pattern MS-2 and the second width MS-W1 of the additional pattern MS-2 according to an embodiment of the inventive concept are not limited thereto. For example, the first width MS-L1 of the additional pattern MS-2 and the second width MS-W1 of the additional pattern MS-2, according to an embodiment of the inventive concept, may be different from each other. The second width ANT-W of the antenna pattern ANT may be m times the second width MS-W1 of the additional pattern MS-2. The above m may be a positive integer greater than 1. For example, FIG. 9 shows that m is 2.

When viewed on a plane, the antenna pattern ANT may overlap k additional patterns MS-2. The above k may be a value obtained by multiplying n and m. For example, FIG. 9 shows that k is 4. Each of the k additional patterns MS-2 may be arranged along the first direction DR1 and the second direction DR2. The n of the k additional patterns MS-2 may be arranged in the first direction DR1. The m thereof may be arranged in the second direction DR2. For example, in FIG. 9, two additional patterns MS-2 are arranged in the first direction DR1 and two additional patterns MS-2 are arranged in the second direction DR2.

The entire k additional patterns MS-2 may have a second center point MS-2C. The second center point MS-2C may be a center point of an area where k additional patterns MS-2 are disposed. When viewed on a plane, the second center point MS-2C may overlap the first center point ANT-C.

According to an embodiment of the inventive concept, the k additional patterns MS-2 may overlap the antenna pattern ANT, and the shielding components CP-2 may shield or reflect a portion of the signal provided by the antenna pattern ANT. The k additional patterns MS-2 may shield or reflect a portion of the signal provided from the antenna pattern ANT. The radiation pattern of the signal emitted by the antenna pattern ANT may be modified by the modified signal. The k additional patterns MS-2 may control the radiation pattern of the signal emitted by the antenna pattern ANT. Accordingly, the display device DD (see FIG. 2) may be provided with increased antenna efficiency.

Figure 9B:
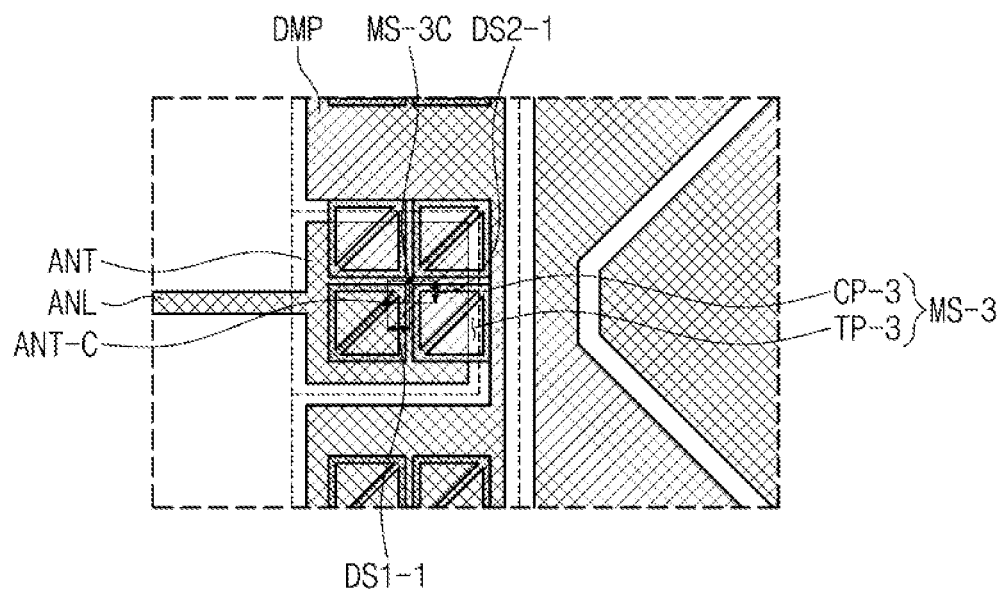
Figure 10A:
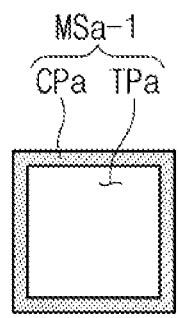
FIGS. 10A to 10E illustrate shapes of additional patterns according to an embodiment of the inventive concept.
Figure 10D:
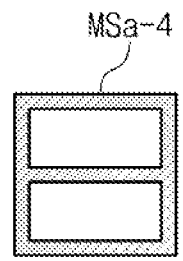
Figure 10B:
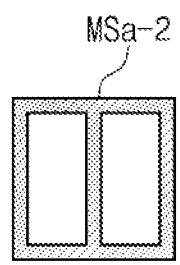
Figure 10E:
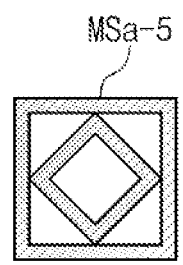
Figure 10C:
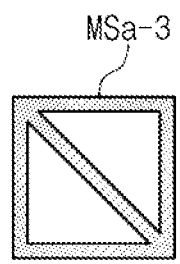
Figure 11A:
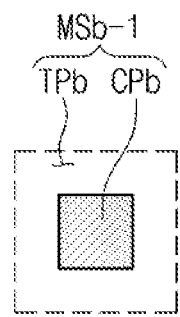
FIGS. 11A to 11E illustrate shapes of additional patterns according to an embodiment of the inventive concept.
Figure 11D:
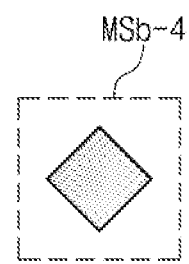
Figure 11B:
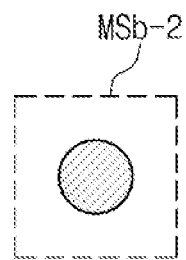
Figure 11E:
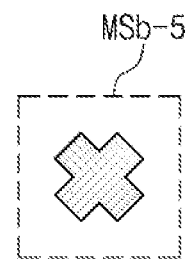
Figure 11C:
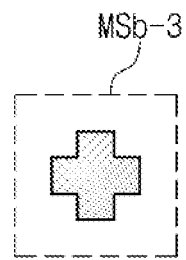
Figure 12A:
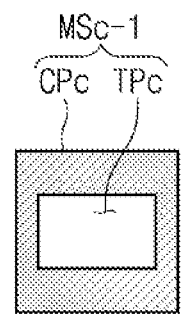
FIGS. 12A to 12D illustrate shapes of additional patterns according to an embodiment of the inventive concept.
Figure 12B:
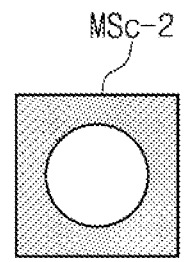
Figure 12C:
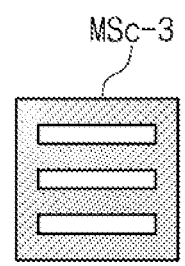
Figure 12D:
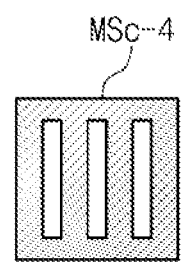

FIG. 9B is an enlarged plan view showing an area of an input sensor and a pattern layer according to an embodiment of the inventive concept. In the description of FIG. 9B, the same reference numerals are given to the components described with reference to FIG. 9A, and a description thereof will be omitted.

Referring to FIG. 9B, a plurality of additional patterns MS-3 may be provided. Each of the plurality of additional patterns MS-3 may be arranged along the first direction DR1 and the second direction DR2. When viewed on a plane, a portion of the area where the plurality of additional patterns MS-3 are disposed may overlap the antenna pattern ANT. Another portion of the area where the plurality of additional patterns MS-3 are disposed may non-overlap the antenna pattern ANT.

When viewed on a plane, the entire plurality of additional patterns MS-3 may have a second center point MS-3C. The second center point MS-3C may be a center point of an area where a plurality of additional patterns MS-3 are disposed.

When viewed on a plane, the second center point MS-3C may overlap a point moved in a direction parallel by the first distance DS1-1 in the first direction DR1 and by the second distance DS2-1 in the second direction DR2 from the first center point ANT-C of the antenna pattern ANT.

The first distance DS1-1 may be smaller than the first width ANT-L (see FIG. 9A) of the antenna pattern ANT, and the second distance DS2-1 may be smaller than the second width ANT-W (see FIG. 9A) of the antenna pattern ANT.

According to an embodiment of the inventive concept, the shielding component CP-3 overlaps a portion of the antenna pattern ANT, such that a portion of the signal provided by the antenna pattern ANT may be shielded or reflected. The additional pattern MS-3 may modify a some or all of the signal provided from the antenna pattern ANT. The direction of the signal emitted by the antenna pattern ANT may be modified by the modified signal. The additional pattern MS-3 may control the direction of the signal emitted by the antenna pattern ANT. Accordingly, the present disclosure provides the display device DD (see FIG. 2) with increased antenna efficiency.

FIGS. 10A to 10E illustrate shapes of additional patterns according to an embodiment of the inventive concept.

Referring to FIGS. 10A to 10E, a plurality of additional patterns MSa-1, MSa-2, MSa-3, MSa-4, and MSa-5 may have a mesh structure. The mesh structure may mean a structure where at least one opening is defined in a shielding component CPa such that a transmission component TPa is disposed in the opening. When viewed on a plane, the shielding component CPa may surround the transmission component TPa.

The plurality of additional patterns MSa-1, MSa-2, MSa-3, MSa-4, and MSa-5 may have various shapes shown in FIGS. 10A to 10E. However, the plurality of additional patterns MSa-1, MSa-2, MSa-3, MSa-4, and MSa-5 shown in FIGS. 10A to 10E are exemplary. The plurality of additional patterns MSa-1, MSa-2, MSa-3, MSa-4, and MSa-5 according to an embodiment of the inventive concept are not limited thereto, and may have various shapes.

FIGS. 11A to 11E illustrate shapes of additional patterns according to an embodiment of the inventive concept.

Referring to FIGS. 11A to 11E, a plurality of additional patterns MSb-1, MSb-2, MSb-3, MSb-4, and MSb-5 may have an island pattern. The island pattern may mean a pattern where the transmission component TPb surrounds the shielding component CPb when viewed on a plane.

The plurality of additional patterns MSb-1, MSb-2, MSb-3, MSb-4, and MSb-5 may have various shapes shown in FIGS. 11A to 11E. However, the plurality of additional patterns MSb-1, MSb-2, MSb-3, MSb-4, and MSb-5 shown in FIGS. 11A to 11E are exemplary. The plurality of additional patterns MSb-1, MSb-2, MSb-3, MSb-4, and MSb-5 according to an embodiment of the inventive concept are not limited thereto, and may have various shapes.

FIGS. 12A to 12D illustrate shapes of additional patterns according to an embodiment of the inventive concept.

Referring to FIGS. 12A to 12D, a plurality of additional patterns MSc-1, MSc-2, MSc-3, MSc-4, and MSc-5 may have a slot pattern. The slot pattern may mean a pattern where slits of various shapes are defined in a shielding component CPc, and a transmission component TPc is disposed in the slit. When viewed on a plane, the shielding component CPc may surround the transmission component TPc.

The plurality of additional patterns MSc-1, MSc-2, MSc-3, MSc-4, and MSc-5 may have various shapes shown in FIGS. 12A to 12D. However, a plurality of additional patterns (MSc-1, MSc-2, MSc-3, MSc-4, MSc-5) illustrated in FIGS. 12A to 12D are exemplary. The plurality of additional patterns MSc-1, MSc-2, MSc-3, MSc-4, and MSc-5, according to an embodiment of the inventive concept, are not limited thereto, and may have various shapes.

Figure 13:
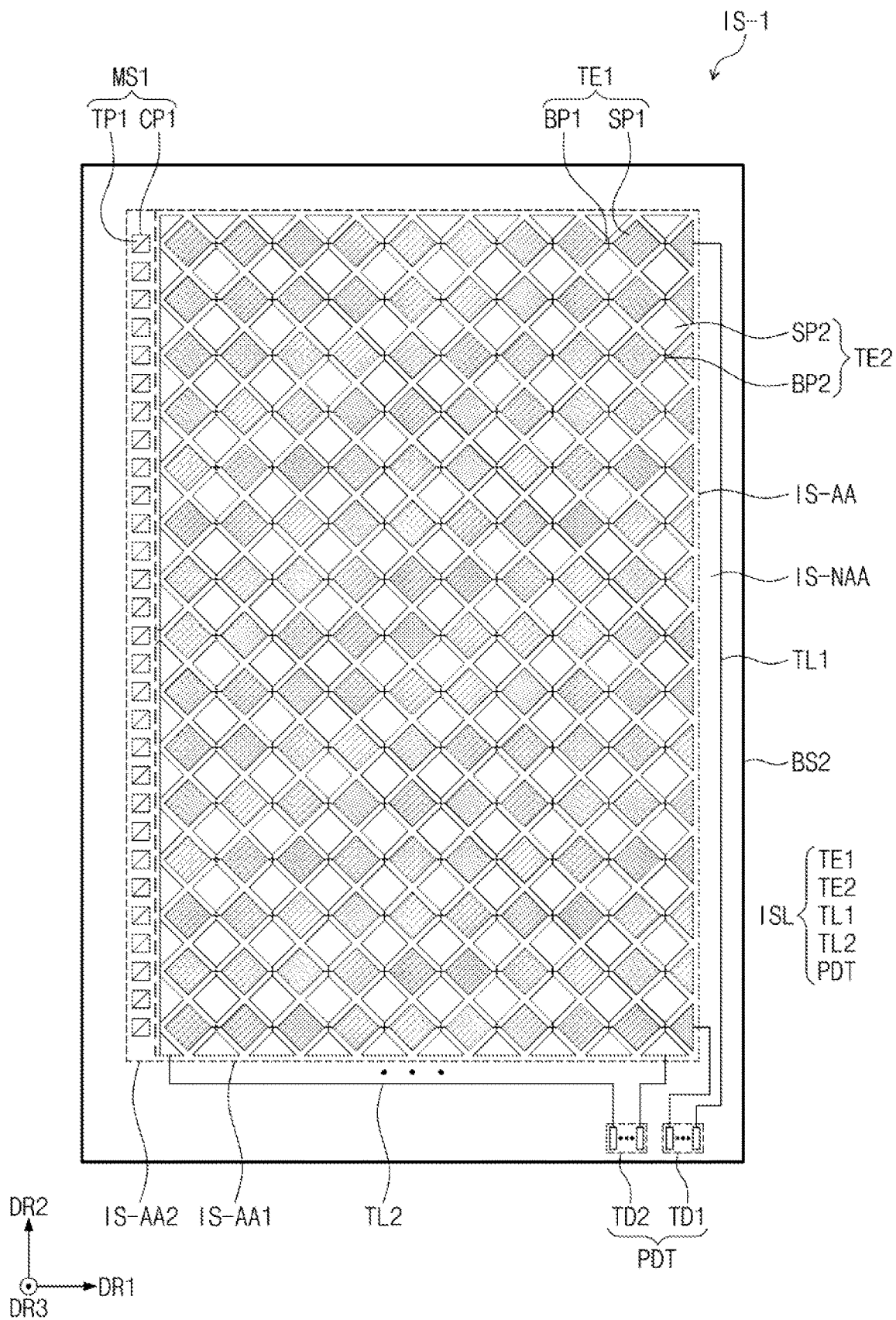
FIG. 13 is a plan view of an input sensor according to an embodiment of the inventive concept.

FIG. 13 is a plan view of an input sensor according to an embodiment of the inventive concept. In the description of FIG. 13, the same reference numerals are given to the components described with reference to FIG. 4, and a description thereof will be omitted.

Referring to FIGS. 2 and 13, the input sensor IS-1 may include an input detection unit ISL and a plurality of additional patterns MS1.

The plurality of additional patterns MS1 may be disposed in the second active area IS-AA2. The first pattern PT1 may be a plurality of additional patterns MS1. The plurality of additional patterns MS1 may be electrically floated. Each of the plurality of additional patterns MS1 may include a shielding component CP1 and a transmission component TP1.

The shielding component CP1 may include a conductive material. For example, the conductive material may include a conductive polymer, carbon nanotube, graphene, carbon, metal and/or metal alloy, or a composite material thereof, and may have a single-layer or multi-layer structure. For example, the metal material may be silver (Ag), copper (Cu), aluminum (Al), gold (Au), or platinum (Pt), but is not limited thereto. The transmission component TP1 may include a dielectric. The transmission component TP1 may have light transmission properties.

Figure 14:
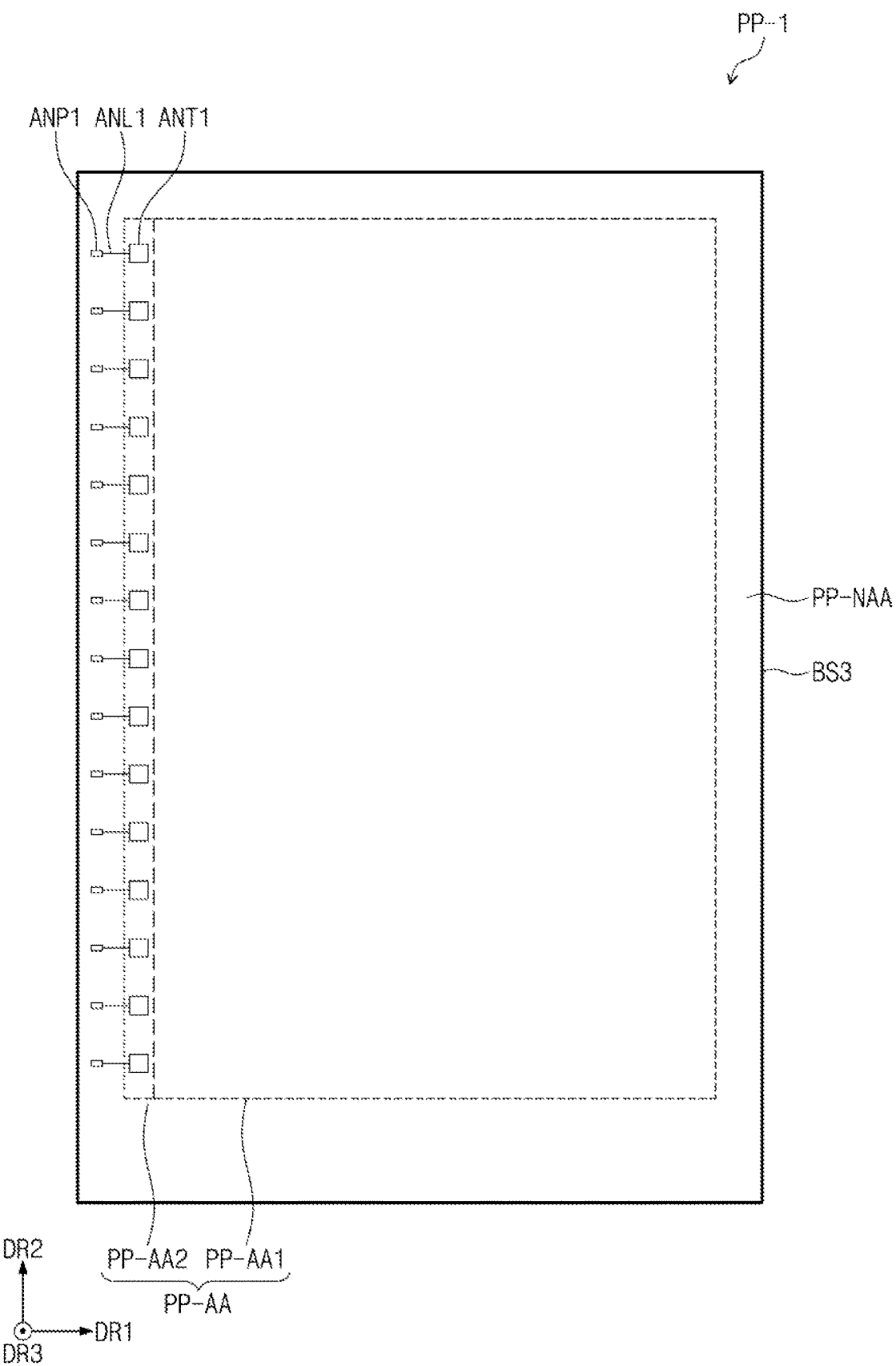
FIG. 14 is a plan view of a pattern layer according to an embodiment of the inventive concept.

FIG. 14 is a plan view of a pattern layer according to an embodiment of the inventive concept. In the description of FIG. 14, the same reference numerals are given to the components described with reference to FIG. 6, and a description thereof will be omitted.

Referring to FIGS. 2, 13, and 14, the pattern layer PP-1 may include a base layer BS3, a plurality of antenna patterns ANT1, a plurality of antenna lines ANL1, and a plurality of antenna pads ANP1.

The plurality of antenna patterns ANT1 may be disposed in the second active area PP-AA2. The second pattern PT2 may be a plurality of antenna patterns ANT1.

The plurality of antenna patterns ANT1 may transmit, receive, or transceive radio frequency signals. The plurality of antenna lines ANL1 may extend from the plurality of antenna patterns ANT1 toward the peripheral area PP-NAA, respectively. The plurality of antenna pads ANP1 may be electrically connected to the plurality of antenna lines ANL1, respectively.

According to an embodiment of the inventive concept, the shielding component CP1 may shield or reflect a signal provided from the antenna pattern ANT1. The transmission component TP1 may transmit a signal provided by the antenna pattern ANT1. The additional pattern MS1 may shield or reflect a portion of the signal and transmit the other portion of the signal. The additional pattern MS1 may modify the signal provided from the antenna pattern ANT1. The modified signal can increase the antenna gain and the directivity of the antenna of the display device DD (see FIG. 2). Accordingly, the display device DD (see FIG. 2) may be provided with increased antenna efficiency.

Although the exemplary embodiments of the inventive concept have been described, it is understood that the inventive concept should not be limited to these exemplary embodiments but various changes and modifications can be made by one ordinary skilled in the art within the spirit and scope of the inventive concept as hereinafter claimed.

What is claimed is:

1. A display device comprising:
    a display panel with an active area and a peripheral area adjacent to the active area;
    an input sensor layer disposed on the display panel and including a plurality of detection electrodes;
    a pattern layer disposed on the input sensor layer;
    a plurality of antenna patterns disposed in the input sensor layer or in the pattern layer; and
    a plurality of additional patterns disposed in the pattern layer, wherein each additional pattern of the plurality of additional patterns includes:
        a shielding component that overlaps a corresponding antenna pattern of the plurality of antenna patterns in a planar view and is configured to shield a signal provided from the corresponding antenna pattern, wherein the shielding component comprises a conductive material that is electrically floated; and
        a transmission component that overlaps the corresponding antenna pattern in the planar view, does not overlap the shielding component in the planar view, and is configured to transmit the signal from the corresponding antenna pattern, wherein an area of the shielding component is smaller than an area of the transmission component in the planar view.

2. The display device of claim 1, wherein the additional pattern overlaps an entire area of the corresponding antenna pattern in the planar view.

3. The display device of claim 1, wherein when viewed in the planar view, the antenna pattern and the additional pattern overlap the active area.

4. The display device of claim 1, wherein the transmission component comprises a dielectric.

5. The display device of claim 1, wherein a width in a first direction of the antenna pattern is equal to a width in the first direction of the additional pattern.

6. The display device of claim 5, wherein a width in a second direction intersecting the first direction of the antenna pattern is equal to a width in the second direction of the additional pattern.

7. The display device of claim 6, wherein when viewed in the planar view, a first center point of the antenna pattern overlaps a second center point of the additional pattern.

8. The display device of claim 6, wherein when viewed in the planar view, a second center point of the additional pattern is a value obtained by parallel-moving by a first distance in the first direction and by a second distance in the second direction from a first center point of the antenna pattern,
    wherein the first distance is smaller than the width in the first direction of the antenna pattern, and the second distance is smaller than the width in the second direction of the antenna pattern.

9. The display device of claim 1, wherein a width in a first direction of the antenna pattern is n times a width in the first direction of the additional pattern, wherein n is a positive integer greater than 1.

10. The display device of claim 9, wherein a width in a second direction intersecting the first direction of the antenna pattern is m times a width in the second direction of the additional pattern, wherein m is a positive integer greater than 1.

11. The display device of claim 10, wherein the additional pattern is provided in plural,
    and wherein the plurality of additional patterns is arranged along the first direction and the second direction.

12. The display device of claim 11, wherein when viewed in the planar view, k patterns among the plurality of additional patterns overlap the antenna pattern, wherein k is a product of n and m.

13. The display device of claim 12, wherein when viewed in the planar view, a first center point of the antenna pattern overlaps a second center point of an area where the k patterns are arranged.

14. The display device of claim 12, wherein when viewed in the planar view, a second center point of an area where the k patterns are disposed is obtained by parallel-moving a first distance in the first direction and by a second distance in the second direction from a first center point of the antenna pattern,
    wherein the first distance is smaller than the width in the first direction of the antenna pattern, and the second distance is smaller than the width in the second direction of the antenna pattern.

15. The display device of claim 1, wherein when viewed in the planar view, the shielding component surrounds the transmission component.

16. The display device of claim 1, wherein when viewed in the planar view, the transmission component surrounds the shielding component.

17. A radio frequency device comprises:
    a base layer;
    an antenna pattern disposed on the base layer;
    a shielding component disposed on a different layer from the antenna pattern that overlaps a corresponding antenna pattern of the plurality of antenna patterns when viewed on a plane, wherein the shielding component comprises a conductive material that is electrically floated; and
    a transmission component adjacent to the shielding component that overlaps the corresponding antenna pattern in the planar view and does not overlap the shielding component in the planar view,
    wherein the shielding component is configured to shield a signal provided from the antenna pattern, and the transmission component is configured to transmit the signal,
    wherein an area of the shielding component is smaller than an area of the transmission component in a planar view.

18. The radio frequency device of claim 17, wherein the transmission component comprises a dielectric.

\* \* \* \* \*